United States Patent
Oonishi (10) Patent No.: US 12,345,615 B2
(45) Date of Patent: Jul. 1, 2025

(54) ABNORMALITY DETERMINATION SYSTEM AND PROGRAM

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 312 days.

(21) Appl. No.: 18/043,556

(22) PCT Filed: Sep. 10, 2021

(86) PCT No.: PCT/JP2021/033286
§ 371 (c)(1),
(2) Date: Feb. 28, 2023

(87) PCT Pub. No.: WO2022/059611
PCT Pub. Date: Mar. 24, 2022

(65) Prior Publication Data
US 2023/0266203 A1    Aug. 24, 2023

(30) Foreign Application Priority Data
Sep. 17, 2020    (JP) .................................. 2020-156633

(51) Int. Cl.
G05B 19/00    (2006.01)
G01M 99/00    (2011.01)
G05B 19/4065    (2006.01)

(52) U.S. Cl.
CPC ....... *G01M 99/005* (2013.01); *G05B 19/4065* (2013.01); *G05B 2219/50206* (2013.01)

(58) Field of Classification Search
CPC ............. G01M 99/005; G05B 19/4065; G05B 2219/50206
See application file for complete search history.

(56) References Cited

U.S. PATENT DOCUMENTS

2023/0130360 A1*   4/2023   Miyoshi ............. G05B 19/4069
703/7

FOREIGN PATENT DOCUMENTS

| CN | 105573249 A | 5/2016 |
| JP | H07-051995 A | 2/1995 |
| JP | H07-132440 A | 5/1995 |
| JP | 2010-244256 A | 10/2010 |

(Continued)

OTHER PUBLICATIONS

International Search Report issued in PCT/JP2021/033286; mailed Nov. 22, 2021.

*Primary Examiner* — Jamel E Williams
(74) *Attorney, Agent, or Firm* — Studebaker Brackett PLLC (57) ABSTRACT

Provided are an abnormality determination system and program that make it possible to accurately detect abnormalities at a machine tool. An abnormality determination system that comprises a detection threshold determination unit that determines a detection threshold for detecting abnormalities at the machine tool on the basis of a motor inference information and an inference precision, a motor measurement unit that acquires motor measurement information about a motor, and a state determination unit that determines the state of the machine tool on the basis of the motor measurement information and the detection threshold.

5 Claims, 4 Drawing Sheets (56) References Cited

FOREIGN PATENT DOCUMENTS

| JP | 2012-254499 A | 12/2012 | | |
|---|---|---|---|---|
| JP | 2014-172102 A | 9/2014 | | |
| JP | 2019-504421 A | 2/2019 | | |
| JP | 2019-070916 A | 5/2019 | | |
| WO | WO-2017111072 A1 * | 6/2017 | ............ | G01H 17/00 |

* cited by examiner

------ ESTIMATED VALUE OF MOTOR TORQUE
——— ACTUAL MEASUREMENT OF MOTOR TORQUE

ERRONEOUSLY DETECTED IF THRESHOLD IS LOW

ABNORMALITY DETECTED

G2

THRESHOLD: HIGH

- - - - - ESTIMATED VALUE OF MOTOR TORQUE
——— ACTUAL MEASUREMENT OF MOTOR TORQUE

FIG. 4

ABNORMALITY DETERMINATION SYSTEM AND PROGRAM

TECHNICAL FIELD

The present invention relates to a system and program for abnormality determination.

BACKGROUND ART

A conventional numerical controller controls and drives a movable part (e.g., a control axis) of a machine tool based on a previously created machining program (NC program) to machine a workpiece, which is a target to be machined, with the movable part.

When an error is found in the machining program, the workpiece is incorrectly positioned relative to the machine tool, or an inputted tool offset is wrong while the numerical controller and the machine tool are operating, interference may occur between the movable part and another movable part of the machine tool or between the movable part and other part of the machine tool.

A technique has been proposed to avoid such an interference. By this technique, the interference between the movable part and other part of the machine tool is simulated based on an anticipated position of the machine tool and data of the shapes of the movable part and other part of the machine tool to detect any abnormality of the machine tool (see, e.g., Patent Document 1).

Patent Document 1: Japanese Unexamined Patent Application, Publication No. 2010-244256

DISCLOSURE OF THE INVENTION

Problems to be Solved by the Invention

A numerical controller described in Patent Document 1 simulates the motion of the machine tool based on simulation conditions including the anticipated position of the movable part of the machine tool and the data of the shape of the machine tool. However, time for the simulation is limited because the numerical controller needs to simulate the motion of the machine tool before the machine tool actually moves. Thus, the numerical controller needs to lower the accuracy of the simulation when there is not much processing time, but conversely, can perform the simulation with high accuracy when there is much processing time. The accuracy of the simulation is also affected by the specification of a calculator that performs the simulation.

When the accuracy of the simulation varies, the numerical controller needs to broaden the range of a detection threshold for detection of abnormality of the machine tool assuming that the simulation accuracy is low. The broadened range of the detection threshold lowers the accuracy of the abnormality detection of the machine tool, even when the numerical controller is able to perform the simulation with high accuracy.

Under these circumstances, required has been an abnormality determination system capable of accurately detecting the abnormality of the machine tool even if the accuracy of the simulation varies.

Means for Solving the Problems

An abnormality determination system of the present disclosure includes: a prereader that prereads a machining program to create command data; an anticipated position calculator that calculates an anticipated position of a movable part of a machine tool based on the command data; an interference checker that simulates a motion of the machine tool based on the anticipated position and data of a shape of the machine tool to check whether the movable part and other part of the machine tool interfere with each other; a motor information estimator that estimates motor estimation information about a motor of the machine tool based on the interference between the movable part and the other part checked by the interference checker; a detection threshold determination unit that determines a detection threshold for detection of abnormality of the machine tool based on the motor estimation information and the estimation accuracy; a motor measuring unit that measures motor measurement information about the motor; and a state determination unit that determines a state of the machine tool based on the motor measurement information and the detection threshold.

A program of the present disclosure causes a computer to perform the steps of: prereading a machining program to create command data; calculating an anticipated position of a movable part of a machine tool based on the command data; simulating a motion of the machine tool based on the anticipated position and data of a shape of the machine tool to check whether the movable part and other part of the machine tool interfere with each other; estimating motor estimation information about a motor of the machine tool based on the interference between the movable part and the other part; determining estimation accuracy of the motor estimation information; determining a detection threshold for detection of abnormality of the machine tool based on the motor estimation information and the estimation accuracy; acquiring motor measurement information about the motor; and determining a state of the machine tool based on the motor measurement information and the detection threshold.

Effects of the Invention

The present invention enables accurate detection of abnormality of a machine tool.

PREFERRED MODE FOR CARRYING OUT THE INVENTION

Figure 1:
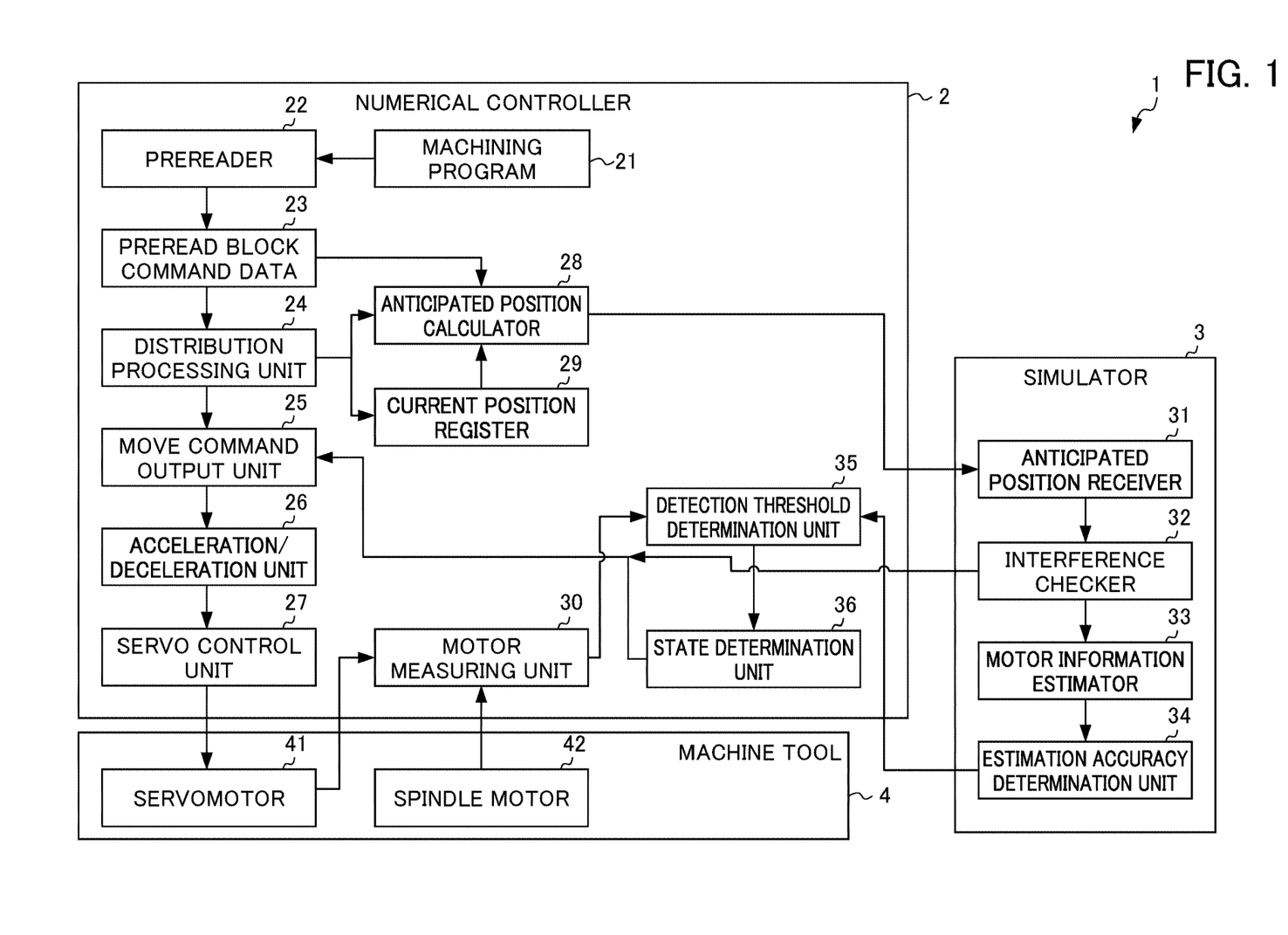
FIG. 1 is view schematically illustrating an abnormality determination system of an embodiment.

An embodiment of the present invention will be described below. FIG. 1 is a view schematically illustrating an abnormality determination system 1 of the present embodiment. The abnormality determination system 1 is used for determination of abnormality of a machine tool. As shown in FIG. 1, the abnormality determination system 1 includes a numerical controller 2 and a simulator 3.

The numerical controller 2 controls a machine tool 4 so that the machine tool 4 performs a predetermined process such as machining. The numerical controller 2 includes a machining program 21, a prereader 22, a preread block command data 23, a distribution processing unit 24, a move command output unit 25, an acceleration/deceleration unit 26, a servo control unit 27, an anticipated position calculator 28, a current position register 29, a motor measuring unit 30, a detection threshold determination unit 35, and a state determination unit 36.

The simulator 3 functions to check by simulation whether a movable part and other part of the machine tool 4 interfere with each other. The simulator 3 includes an anticipated position receiver 31, an interference checker 32, a motor information estimator 33, and an estimation accuracy determination unit 34.

The machining program 21 is stored in a storage device such as a memory of the numerical controller 2, and causes the machine tool 4 to perform predetermined machining.

The prereader 22 prereads the machining program 21 to create command data from the machining program 21. Specifically, the prereader 22 creates the preread block command data 23 as the command data.

The preread block command data 23 is multiple items of data that are read block by block from the machining program 21 by the prereader 22 and converted into an executable form. The preread block command data 23 is stored in a storage device such as a memory of the numerical controller 2.

The distribution processing unit 24 reads the preread block command data 23 block by block, and calculates a distribution travel amount that is given as a command to a servomotor 41 of each axis every distribution cycle based on a travel amount and speed of each axis instructed by the block. The distribution processing unit 24 adds the calculated distribution travel amount to, for example, the current position register 29 to update the current position of the servomotor 41 of each axis. The distribution processing unit 24 also outputs the calculated distribution travel amount to the acceleration/deceleration unit 26 via the move command output unit 25.

When receiving a axis stop command from the simulator 3, the move command output unit 25 stops the output of the distribution travel amount in the move command received from the distribution processing unit 24 to the acceleration/deceleration unit 26. The move command output unit 25 outputs the move command to the acceleration/deceleration unit 13 unless the simulator 3 inputs the axis stop command.

The acceleration/deceleration unit 26 performs acceleration or deceleration based on the move command, and outputs the move command to move by the accelerated or decelerated travel amount to the servo control unit 27.

The servo control unit 27 performs feedback control of position and speed based on feedback about the position and the speed from a position and speed detector attached to the servomotor 41 (or the movable part of the machine tool 4 driven by the servomotor 41) and the move command outputted from the acceleration/deceleration unit 26. The servo control unit 27 controls and drives the servomotor 41 via a servo amplifier.

Although FIG. 1 shows only a single servomotor 41, the servo control unit 27 controls the servomotors 41 of the axes of the machine tool 4 in the same manner. That is, the servo control unit 27 controls the positions and speeds of the servomotors 41 of the axes.

The anticipated position calculator 28 calculates the anticipated position of the movable part of the machine tool 4 based on the preread block command data 23 which is the command data.

Specifically, the anticipated position calculator 28 calculates the anticipated position of the movable part of the machine tool 4 based on the current position of the movable part of the machine tool 4, preset anticipated time, and the preread block command data 23. The anticipated position of the movable part of the machine tool 4 is the position to which the movable part driven by the servomotor 41 moves after the anticipated time.

The anticipated position calculator 28 outputs the anticipated time and the coordinates of the anticipated position to the simulator 3 so that whether the movable part and other part of the machine tool 4 interfere with each other is checked.

The movable part of the machine tool 4 includes a workpiece, a tool (e.g., a cutting tool), and other movable parts than the workpiece and the tool that are driven by the servomotor 41. The other part of the machine tool 4 includes parts other than the workpiece, the tool, and the movable parts that are driven by the servomotor 41.

The current position register 29 registers the current position of the movable part of the machine tool 4. The current position of the movable part of the machine tool 4 is sequentially updated by the distribution processing unit 24.

The motor measuring unit 30 measures motor measurement information about the servomotor 41. Specifically, the motor measuring unit 30 measures the motor measurement information, for example, a current value of the motor, a load on the servomotor 41 estimated from the current value, and a load on a spindle. The motor measuring unit 30 may measure the motor measurement information about a spindle motor 42 in addition to the motor measurement information about the servomotor 41.

The anticipated position receiver 31 of the simulator 3 receives the anticipated position of the movable part of the machine tool 4 calculated by the anticipated position calculator 28.

The interference checker 32 checks the interference between the movable part and other part of the machine tool 4 based on the anticipated position of the movable part of the machine tool 4 and the data of the shape of the machine tool 4. Specifically, the interference checker 32 simulates the motion of the machine tool 4 based on the simulation conditions including the anticipated position and the data of the shape of the machine tool 4 to check whether the movable part and other part of the machine tool 4 interfere with each other.

The data of the shape of the machine tool 4 is, for example, based on design data of the machine tool 4, and is stored in the memory of the numerical controller 2.

The motor information estimator 33 estimates motor estimation information about the motor of the machine tool 4 based on the interference between the movable part and the other part checked by the interference checker 32. Specifically, the motor information estimator 33 estimates the motor estimation information including the load on the servomotor 41, the current value of the servomotor 41 estimated from the load on the servomotor 41, the load on the spindle, and the current value of the spindle based on the interference between the movable part and other part of the machine tool 4, i.e., the simulation of the motion of the machine tool 4.

The estimation accuracy determination unit 34 determines the estimation accuracy of the motor estimation information estimated by the motor information estimator 33. Specifically, the estimation accuracy determination unit 34 determines the estimation accuracy of the motor estimation information based on the simulation conditions, such as temporal resolution and the accuracy of the shape data.

Then, the detection threshold determination unit 35 of the numerical controller 2 determines the detection threshold for detection of abnormality of the machine tool 4 based on the motor estimation information and the estimation accuracy. Specifically, the detection threshold determination unit 35 determines the detection threshold to be relatively low when the estimation accuracy is relatively high, and to be relatively high when the estimation accuracy is relatively low.

The state determination unit 36 determines the state of the machine tool 4 based on the motor measurement information measured by the motor measuring unit 30 and the detection threshold determined by the detection threshold determination unit 35. Specifically, the state determination unit 36 determines that the motion of the machine tool 4 is abnormal when the motor measurement information exceeds the detection threshold, and determines that the motion of the machine tool 4 is normal when the motor measurement information does not exceed the detection threshold.

A conventional simulator simulates the motion of the machine tool 4 based on the simulation conditions including the anticipated position of the movable part of the machine tool and the data of the shape of the machine tool. However, the simulator needs to end the simulation before the machine tool actually moves, and the time for the simulation is limited.

Thus, when determining the detection threshold for the detection of the abnormality of the machine tool, a conventional numerical controller needs to broaden the range of the detection threshold assuming that the accuracy of the simulation by the simulator is low. The broadened range of the detection threshold lowers the accuracy of the abnormality detection of the machine tool, even when the numerical controller is able to perform the simulation with high accuracy.

The abnormality determination system 1 of the present embodiment determines the detection threshold based on the accuracy of the simulation, thereby raising the accuracy of the abnormality detection of the machine tool 4.

Figure 2A:
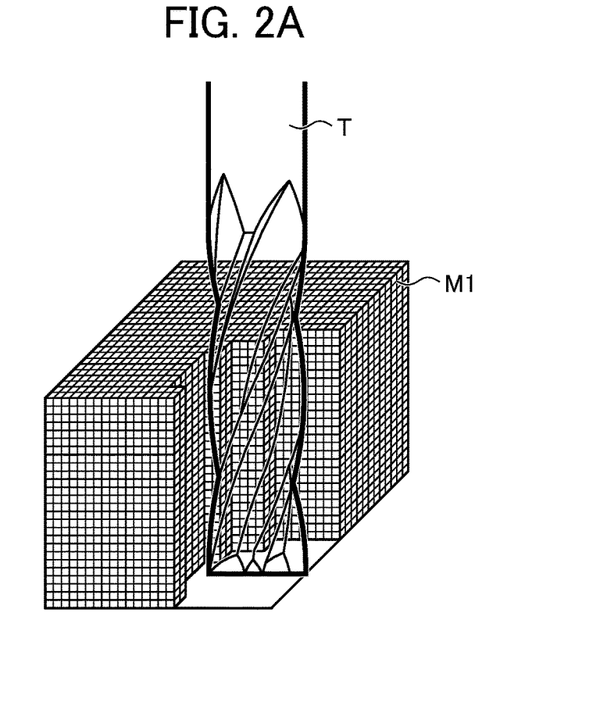
FIG. 2A is a view illustrating a voxel model of a workpiece that a machine tool cuts.
Figure 3A:
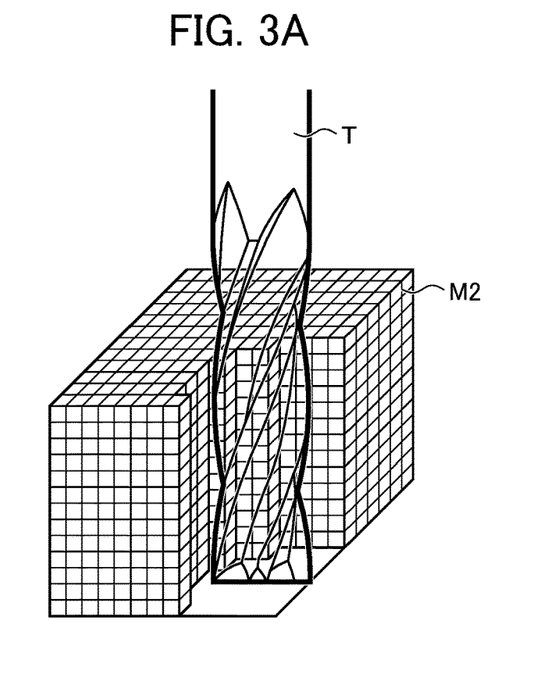
FIG. 3A is a view illustrating a voxel model of the workpiece that the machine tool cuts.
Figure 3B:
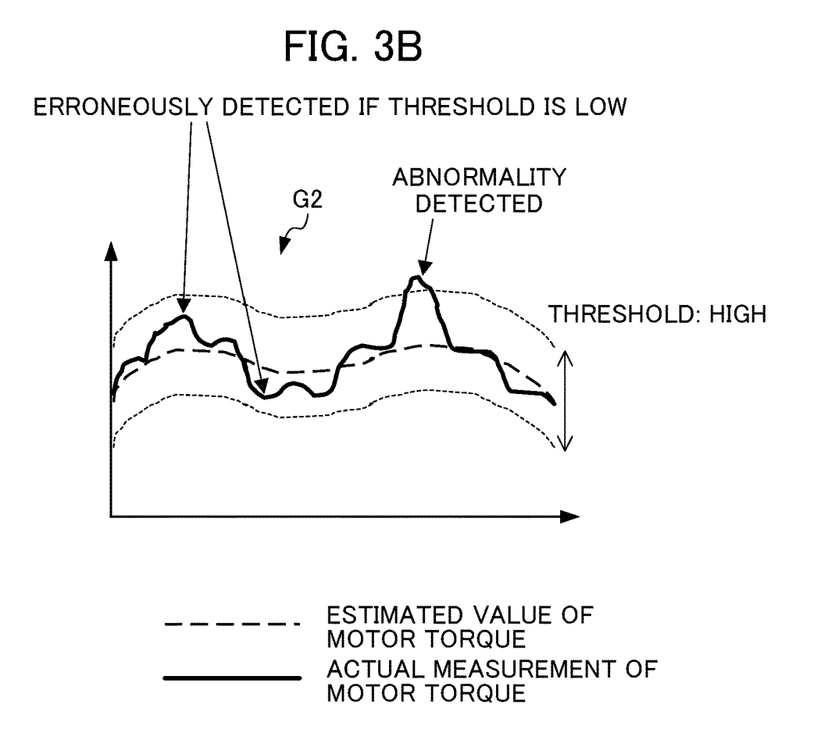
FIG. 3B is a graph illustrating an example of the detection threshold.

FIGS. 2A and 3A are views each illustrating a voxel model of a workpiece that the machine tool 4 cuts, and FIGS. 3A and 3B are graphs each illustrating an example of the detection threshold.

As shown in FIGS. 2A and 3A, the simulator 3 uses voxel models M1 and M2 to express the workpiece that the machine tool 4 cuts. Each of the voxel models M1 and M2 is a model representing a target shape by an assembly of fine cubes.

The interference checker 32 of the simulator 3 simulates the motion of the workpiece that the machine tool 4 cuts (i.e., the other part of the machine tool 4) and the motion of the movable part of the machine tool 4 (e.g., the cutting tool T shown in FIGS. 2A and 3A) using the voxel models M1 and M2.

For example, the interference checker 32 simulates a cutting load and motor torque from the geometric relationship between the voxel models M1 and M2 of the workpiece and the cutting tool T. The simulation of the cutting load and the motor torque using the voxel models can be made by various methods, and the interference checker 32 of the present embodiment simulates the cutting load and the motor torque by a known method. The interference checker 32 performs the simulation so that only a target part of the voxel models M1 and M2 to be cut remains as the cutting by the cutting tool T proceeds.

The accuracy of the simulation varies depending on, for example, the simulation conditions such as the size of the voxels of the voxel models M1 and M2 and the temporal resolution. For this reason, the interference checker 32 adjusts the simulation conditions so that the simulation can be completed within a limited time.

The estimation accuracy determination unit 34 determines the estimation accuracy of the motor estimation information based on the adjusted simulation conditions. For example, on the simulation condition that the voxels of the voxel model M1 shown in FIG. 2A have the smaller size than the voxels of the voxel model M2 shown in FIG. 3A, the estimation accuracy determination unit 34 determines the estimation accuracy of the motor estimation information (e.g., an estimated value of the motor torque) to be relatively high.

Figure 2B:
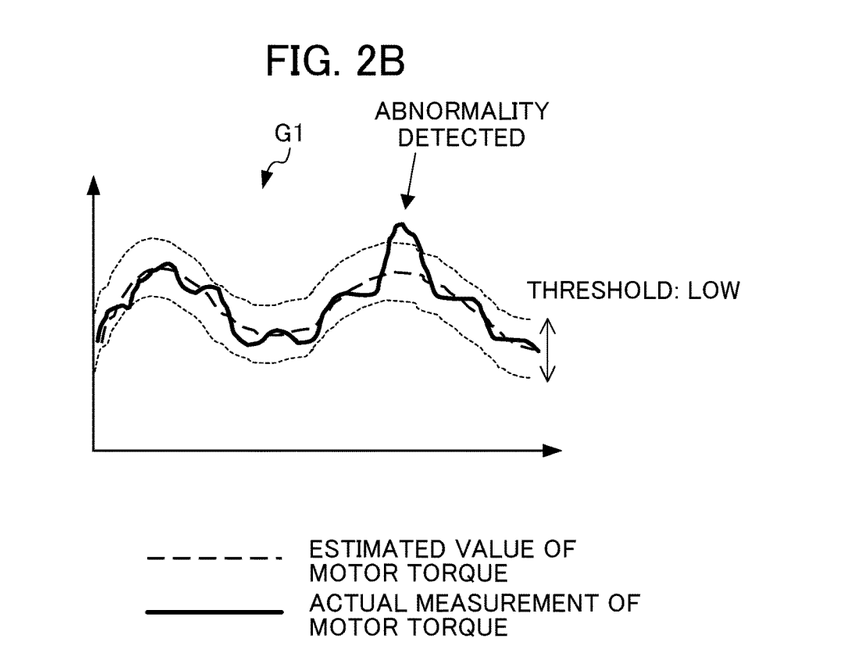
FIG. 2B is a graph illustrating an example of a detection threshold.

As can be seen in the graph G1 in FIG. 2B, the detection threshold determination unit 35 determines the detection threshold to be relatively low when the estimation accuracy is relatively high. Thus, as shown in FIG. 2B, the state determination unit 36 determines the state of the machine tool 4 based on the motor measurement information (e.g., an actual measurement of the motor torque) and the detection threshold determined by the detection threshold determination unit 35.

Likewise, the simulator 3 uses the voxel model M2 shown in FIG. 3A to express the workpiece that the machine tool 4 cuts. The simulator 3 simulates the motion of the workpiece that the machine tool 4 cuts (i.e., the other part of the machine tool 4) and the motion of the movable part of the machine tool 4 (e.g., the cutting tool T shown in FIG. 3A) using the voxel model M2.

For example, on the simulation condition that the voxels of the voxel model M2 shown in FIG. 3A have the larger size than the voxels of the voxel model M2 shown in FIG. 2A, the estimation accuracy determination unit 34 determines the estimation accuracy of the motor estimation information (e.g., an estimated value of the motor torque) to be relatively low.

As can be seen in the graph G2 in FIG. 3B, the detection threshold determination unit 35 determines the detection threshold to be relatively high when the estimation accuracy is relatively low. Thus, the state determination unit 36 determines the state of the machine tool 4 based on the motor measurement information (e.g., an actual measurement of the motor torque) and the detection threshold determined by the detection threshold determination unit 35.

When the detection threshold is determined to be relatively high, the state determination unit 36 does not detect the actual measurement of the motor torque that may be erroneously detected if the detection threshold remains relatively low, i.e., determines that the machine tool 4 is in a normal state.

Thus, when the estimation accuracy of the motor estimation information (e.g., the estimated value of the motor torque) is relatively low, the abnormality determination system 1 determines the detection threshold to be relatively high to appropriately determine the state of the machine tool 4.

Figure 4:
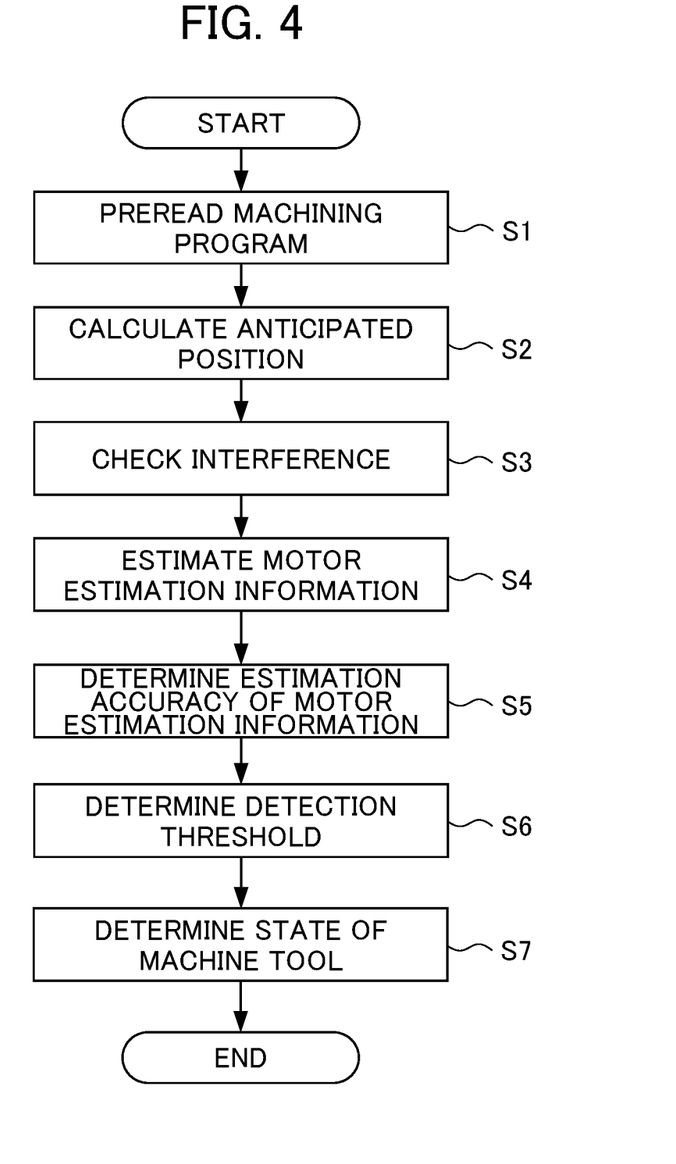
FIG. 4 is a flowchart illustrating a process performed by the abnormality determination system of the embodiment.

FIG. 4 is a flowchart illustrating the process performed by the abnormality determination system 1 of the present embodiment. In Step S1, the prereader 22 prereads the machining program 21 before the machine tool 4 moves, and creates the preread block command data 23 as the command data.

In Step S2, the anticipated position calculator 28 calculates the anticipated position of the movable part of the machine tool 4 based on the current position of the movable part of the machine tool 4, preset anticipated time, and the preread block command data 23.

In Step S3, the interference checker 32 simulates the motion of the machine tool 4 based on the simulation conditions including the anticipated position and the data of the shape of the machine tool 4 to check whether the movable part and other part of the machine tool 4 interfere with each other.

In Step S4, the motor information estimator 33 estimates the motor estimation information about the motor of the machine tool 4 based on the interference between the movable part and the other part checked by the interference checker 32.

In Step S5, the estimation accuracy determination unit 34 determines the estimation accuracy of the motor estimation information estimated by the motor information estimator 33.

In Step S6, the detection threshold determination unit 35 determines the detection threshold for the detection of the abnormality of the machine tool 4 based on the motor estimation information and the estimation accuracy.

In Step S7, the state determination unit 36 determines the state of the machine tool 4 based on the motor measurement information measured by the motor measuring unit 30 and the detection threshold determined by the detection threshold determination unit 35.

As described above, the abnormality determination system 1 of the present embodiment includes: the prereader 22 that prereads the machining program 21 to create the preread block command data 23 as the command data; the anticipated position calculator 28 that calculates the anticipated position of the movable part of the machine tool 4 based on the preread block command data 23; the interference checker 32 that simulates the motion of the machine tool 4 based on the anticipated position and the data of the shape of the machine tool 4; the motor information estimator 33 that estimates the motor estimation information about the motor of the machine tool 4 based on the interference between the movable part and the other part checked by the interference checker 32; the estimation accuracy determination unit 34 that determines the estimation accuracy of the motor estimation information; the detection threshold determination unit 35 that determines the detection threshold for the detection of the abnormality of the machine tool 4 based on the motor estimation information and the estimation accuracy; the motor measuring unit 30 that acquires the motor measurement information about the motor; and the state determination unit 36 that determines the state of the machine tool 4 based on the motor measurement information and the detection threshold.

Determining the detection threshold based on the accuracy of the simulation, the abnormality determination system 1 can accurately detect the abnormality of the machine tool 4 even if the accuracy of the simulation varies. Thus, the abnormality determination system 1 can accurately detect the abnormality of the machine tool 4 when the simulated motion of the machine tool 4 is different from the actual motion of the machine tool (e.g., the position of the workpiece is incorrect or the cutting tool is damaged) even if the accuracy of the simulation varies.

The detection threshold determination unit 35 determines the detection threshold to be relatively low when the estimation accuracy is relatively high, and determines the detection threshold to be relatively high when the estimation accuracy is relatively low. Determining the detection threshold based on the accuracy of the simulation, the abnormality determination system 1 can set the detection threshold for the detection of the abnormality of the machine tool 4 to an appropriate value.

The interference checker 32 simulates the motion of the machine tool 4 based on the simulation conditions including the anticipated position and the data of the shape of the machine tool 4 to check whether the movable part and other part of the machine tool 4 interfere with each other. The estimation accuracy determination unit 34 determines the estimation accuracy of the motor estimation information based on the simulation conditions. Thus, the abnormality determination system 1 can determine the estimation accuracy of the motor estimation information that indicates the accuracy of the simulation, and can accurately detect the abnormality of the machine tool 4 based on the accuracy of the simulation.

The state determination unit 36 determines that the motion of the machine tool 4 is abnormal when the motor measurement information exceeds the detection threshold, and determines that the motion of the machine tool 4 is normal when the motor measurement information does not exceed the detection threshold.

The abnormality determination system 1 further includes the numerical controller 2 that controls the machine tool 4 and the simulator 3 that simulates the motion of the machine tool 4. The numerical controller 2 includes the prereader 22, the anticipated position calculator 28, the motor measuring unit 30, the detection threshold determination unit 35, and the state determination unit 36. The simulator 3 includes the interference checker 32, the motor information estimator 33, and the estimation accuracy determination unit 34. Thus, the abnormality determination system 1 can accurately detect the abnormality of the machine tool 4 using the numerical controller 2 and the simulator 3.

The abnormality determination system 1 of the embodiment of the present invention described above can be implemented by hardware, software, or a combination of the hardware and the software. A method of control by the abnormality determination system 1 described above can also be implemented by hardware, software, or a combination of the hardware and the software. The expression "implemented by the software" means that a computer reads and executes a program to implement the functions of the abnormality determination system or method.

The program is stored in various types of non-transitory computer readable media and supplied to the computer. The non-transitory computer readable media include various types of tangible storage media. Examples of the non-transitory computer readable media include a magnetic recording medium (e.g., a hard disk drive), a magneto-optical recording medium (e.g., a magneto-optical disk), a compact disc read only memory (CD-ROM), a CD-R, a CD-R/W, and a semiconductor memory (e.g., a mask ROM, a programmable ROM (PROM), an erasable PROM (EPROM), a flash ROM, and a random-access memory (RAM)).

The embodiments have been described above as advantageous embodiments of the present invention, but the scope of the present invention is not limited to the embodiments. Various types of modifications can be made without departing from the spirit of the present invention.

EXPLANATION OF REFERENCE NUMERALS

1 Abnormality determination system
2 Numerical controller
3 Simulator 4 Machine tool
21 Machining program
22 Prereader
23 Preread block command data
24 Distribution processing unit
25 Move command output unit
26 Acceleration/deceleration unit
27 Servo control unit
28 Anticipated position calculator
29 Current position register
30 Motor measuring unit
31 Anticipated position receiver
32 Interference checker
33 Motor information estimator
34 Estimation accuracy determination unit
35 Detection threshold determination unit
36 State determination unit

The invention claimed is:

1. An abnormality determination system, comprising:
a prereader that prereads a machining program to create command data;
an anticipated position calculator that calculates an anticipated position of a movable part of a machine tool based on the command data;
an interference checker that simulates a motion of the machine tool based on the anticipated position and data of a shape of the machine tool to check whether the movable part and other part of the machine tool interfere with each other;
a motor information estimator that estimates motor estimation information about a motor of the machine tool based on the interference between the movable part and the other part checked by the interference checker;
an estimation accuracy determination unit that determines estimation accuracy of the motor estimation information;
a detection threshold determination unit that determines a detection threshold for detection of abnormality of the machine tool based on the motor estimation information and the estimation accuracy;
a motor measuring unit that measures motor measurement information about the motor; and
a state determination unit that determines a state of the machine tool based on the motor measurement information and the detection threshold.

2. The abnormality determination system of claim 1, wherein the detection threshold determination unit determines the detection threshold to be relatively low when the estimation accuracy is relatively high, and determines the detection threshold to be relatively high when the estimation accuracy is relatively low.

3. The abnormality determination system of claim 1, wherein
the interference checker simulates the motion of the machine tool based on simulation conditions including the anticipated position and the data of the shape of the machine tool to check whether the movable part and the other part of the machine tool interfere with each other, and
the estimation accuracy determination unit determines the estimation accuracy of the motor estimation information based on the simulation conditions.

4. The abnormality determination system of claim 1, wherein the state determination unit determines that the motion of the machine tool is abnormal when the motor measurement information exceeds the detection threshold, and determines that the motion of the machine tool is normal when the motor measurement information does not exceed the detection threshold.

5. A non-transitory computer-readable storage medium storing a program that is executed by a computer that comprises a processor of an abnormality determination system, the program being executable to cause the computer to perform operations comprising:
prereading a machining program to create command data;
calculating an anticipated position of a movable part of a machine tool based on the command data;
simulating a motion of the machine tool based on the anticipated position and data of a shape of the machine tool to check whether the movable part and other part of the machine tool interfere with each other;
estimating motor estimation information about a motor of the machine tool based on the interference between the movable part and the other part;
determining estimation accuracy of the motor estimation information;
determining a detection threshold for detection of abnormality of the machine tool based on the motor estimation information and the estimation accuracy;
acquiring motor measurement information about the motor; and
determining a state of the machine tool based on the motor measurement information and the detection threshold.

* * * * *